US012615144B2

(12) United States Patent
Pellizzer et al.

(10) Patent No.: US 12,615,144 B2
(45) Date of Patent: Apr. 28, 2026

(54) METHOD FOR TUNNELING AN INTERNET PROTOCOL CONNECTION BETWEEN TWO ENDPOINTS

(71) Applicant: Xiid Corporation, Las Vegas, NV (US)

(72) Inventors: Guido Pellizzer, Lovere (IT); Federico Simonetti, Cupertino, CA (US)

(73) Assignee: Xiid Corporation

( * ) Notice: Subject to any disclaimer, the term of this patent is extended or adjusted under 35 U.S.C. 154(b) by 196 days.

(21) Appl. No.: 17/864,860

(22) Filed: Jul. 14, 2022

(65) Prior Publication Data

US 2024/0022402 A1 Jan. 18, 2024

(51) Int. Cl.
H04L 9/08 (2006.01)
H04L 9/40 (2022.01)
H04L 12/46 (2006.01)

(52) U.S. Cl.
CPC .......... H04L 9/088 (2013.01); H04L 63/0428 (2013.01); H04L 63/083 (2013.01);
(Continued)

(58) Field of Classification Search
CPC ... H04L 9/08; H04L 9/40; H04L 9/088; H04L 63/083; H04L 63/08; H04L 63/0428;
(Continued)

(56) References Cited

U.S. PATENT DOCUMENTS

| | | | | |
|---|---|---|---|---|
| 7,599,283 | B1 * | 10/2009 | Varier ..................... | H04L 45/00 370/254 |
| 10,063,591 | B1 * | 8/2018 | Jiang ................... | H04L 63/1416 |
| 2015/0128205 | A1 * | 5/2015 | Mahaffey .............. | H04L 63/105 726/1 |

FOREIGN PATENT DOCUMENTS

WO WO-2015049138 A1 * 4/2015 ......... H04L 63/0428

OTHER PUBLICATIONS

"Tunnel Extensible Authentication Protocol (TEAP) Version 1"—Zhou et al, Infineon Technologies, Internet Engineering Task Force (IETF), May 2014 https://www.rfc-editor.org/rfc/pdfrfc/rfc7170.txt.pdf (Year: 2014).*

(Continued)

*Primary Examiner* — Randy A Scott
(74) *Attorney, Agent, or Firm* — Jordan Powell

(57) ABSTRACT

The present invention describes a method for secure communication between two endpoints comprising a first endpoint connected with a request collector using a first poll-pull communication link, wherein the first endpoint authenticates with the request collector. A second endpoint connects with the request collector using a second poll-pull communication link and authenticates with the request collector. Once both endpoints are authenticated, the first endpoint prepares a first encrypted communication by encrypting a communication, encapsulates the first encrypted communication in a first IP packet and sends the first IP packet to the request collector using the first poll-pull communication link. The request collector receives the first IP packet and extracts and decrypts the first encrypted communication to obtain the communication and prepares a second encrypted communication by encrypting the communication and encapsulates the second encrypted communication in a second IP packet. The request collector makes the IP packet available to the second poll-pull communication link. The second endpoint extracts the second IP packet from the request collector using the second poll-pull communication link and receives the IP packet from the second poll-pull communication link, extracts the second encrypted communication from the IP packet and decrypts the second encrypted communication to obtain the communication.

20 Claims, 5 Drawing Sheets

(52) U.S. Cl.
CPC ...... *H04L 12/4633* (2013.01); *H04L 63/0272*
(2013.01); *H04L 63/0407* (2013.01); *H04L*
*63/0478* (2013.01); *H04L 63/0485* (2013.01);
*H04L 63/10* (2013.01); *H04L 63/105*
(2013.01); *H04L 63/1466* (2013.01)

(58) Field of Classification Search
CPC ... H04L 9/14; H04L 12/4633; H04L 63/0272;
H04L 63/0407; H04L 63/0478; H04L
63/0485; H04L 63/10; H04L 63/105;
H04L 63/1466
See application file for complete search history.

(56) References Cited

OTHER PUBLICATIONS

"Linking Remote Attestation to Secure Tunnel Endpoints"—
Goldman et al, IBM, Nov. 3, 2006 https://dl.acm.org/doi/pdf/10.
1145/1179474.1179481 (Year: 2006).*

* cited by examiner

100

102

| STEPS | | | |
|---|---|---|---|
| 404 | E201 comes alive | | E202 comes alive |
| 406 | E201 connects w/ RC203 | | E202 connects w/ RC203 |
| 408 | E201 authenticates w/ RC203 | | E202 authenticates w/ RC203 |
| 410 | Request to establish tunnel | | |
| 412 | | RC203 verifies E202 is available | |
| 414 | E201 prepares SYN | | |
| 416 | Encrypt SYN | | |
| 418 | Encapsulate SYN | | |
| 420 | Send IP Packet | | |
| 422 | | Extract & Decrypt SYN | |
| 424 | | Encrypt SYN | |
| 426 | | Ecanpsulate SYN in IP Packet | |
| 428 | | Retrieve IP Packet | |
| 430 | | | Extract encrypted SYN |
| 432 | | Response | |

STEPS   804   E701 comes alive.                                           E702 comes alive 806   E701 connects w/ RC703                    E702 connects w/ RC703

808   E701 authenticates w/ RC703               E702 authenticates w/ RC703

810   Request to establish tunnel

812                                        RC703 verifies E702 is available

814   E701 prepares SYN

816   Encrypt SYN

818   Encapsulate SYN

820   Send IP Packet

822                  Extract & Decrypt SYN

824                     Encrypt SYN

826              Ecanpsulate SYN in IP Packet

828                           Retrieve IP Packet

830                                              Extract encrypted SYN

832                              Response

METHOD FOR TUNNELING AN INTERNET PROTOCOL CONNECTION BETWEEN TWO ENDPOINTS

BACKGROUND

This invention relates to secure data transfer in an Internet Protocol ("IP") connection in a computing environment, and in particular, to the establishment of an IP (Internet Protocol) connection, and consequent communication, between two endpoints located behind two distinct firewalls none of which has inbound rules or open ports. For the sake of this invention, an endpoint is a generic term that identifies any device, physical or virtual, that has IP connection/communication capabilities, including but not limited to sensors, IoT devices, virtual machines, actual computing devices like laptops, tablets, personal computers and mainframes, etc.

Pursuant to conventional systems, establishment of an IP (Internet Protocol) connection, and consequent communication, between two endpoints located behind two distinct firewalls none of which has inbound rules or open ports would normally be impossible to establish, as IP requires the endpoint on the receiving end of the connection establishment request packet (the first SYN packet of the so-called three-way handshake) (the SYN packet, or synchronization packet, is a TCP (Transmission Control Protocol) sent from one device to another requesting that a connection between the two devices be established) to be directed from a specific source IP address and port to a specific destination IP address and port, and the firewall associated with either IP address would prevent the delivery of such a packet by virtue of not having any inbound rule or open port.

Virtual Private Networks (VPNs) overcome this described limitation by using a so-called "concentrator", which is a device capable of IP communications that acts as a virtual routing device between all other endpoints connected to the same VPN. But, by their very nature, VPN's are networks, not end-to-end tunnels. This means that an arbitrary number of devices can be part of such network at any given time, allowing each device to send IP packets to any other device belonging to the same virtual network. This, in turn, reduces security. In fact, if any device in a VPN can send any IP packet to any other device that is part of the same VPN, should one of such devices be infected by (for example) malware or ransomware, the VPN would do nothing to prevent that infected device from spreading the malware to other endpoints connected to the same VPN by simply being able to send them IP packets.

Legacy VPN networks have utilized a type of "tunneling" to support VPN networks called Layer 2 Tunneling Protocol, or L2TP. L2TP uses encryption only for its own control messages and does not supply encryption or confidentiality for the content transmitted through the tunnel. L2TP provides a tunnel for Layer 2 of the ISO/OSI (International Standardization Organization/Open System Interconnection) model and operates only in Layer 2 which is the data link portion of the host router protocol. L2TP is the combination of Microsoft's Point-to-Point Tunneling ("PPTP") and Cisco's Layer 2 Forwarding ("L2F"), both of which also operate in Layer 2 (note that PPTP operates exclusively in Layer 2 and Layer 3 which is network portion of the host router protocol). L2TP is coupled with a VPN and IPSec in order to encrypt the data payload. IPSec is a secure network protocol suite that authenticates and encrypts the packets of data to provide secure encrypted communication between two computers over an IP network. IPSec also operates in Layer 2.

As mentioned above, security in a VPN is greatly reduced because an arbitrary number of devices can be part of a VPN at any given time, and because the payload encapsulated in each IP packet is essentially just another IP packet, allowing each device to send IP packets to any other device belonging to the same virtual network, including any infection of malicious software any of the connected devices might have. Like an infectious disease, the malicious software can then be spread throughout the entire VPN network. To reduce such risk to a minimum, there is a need to restrict as many connections as possible to the 2 specific endpoints that need to communicate, making each connection a de-facto point-to-point connection. This way, if an infected endpoint is allowed to establish a connection to another endpoint, there is a guarantee that the infected device will only be able to spread the infection to that one single endpoint it connected to, and not to every other endpoint that's part of a certain VPN.

An additional weakness of a VPN is that the VPN must communicate with the endpoints through inbound ports. This includes L2TP (and its predecessors) and IPSec. Opening inbound ports for use by the VPNs and any other communication protocols weakens the security of the firewall because hackers can attack inbound ports. Hackers cannot attack outbound ports. Thus a need to establish an end-to-end secure communication channel between two endpoints utilizing only outbound ports is needed.

There is therefore a need to restrict endpoint-to-endpoint connections to the 2 specific endpoints that need to be part of a particular communication, making each connection a de-facto point-to-point connection, and to prevent the use of inbound rules/ports on firewalls. This way, if an infected endpoint is allowed to establish a connection to another endpoint, there is a guarantee that the infected device will only be able to spread the infection to that one single endpoint it connected to, and not to every other endpoint that's part of a network like a VPN.

By combining this with strong authentication, both at the user/device level and at the encryption level by means of AEAD (Authenticated Encryption with Associated Data) techniques, the likelihood of a malware or a malicious actor to successfully attack a remote endpoint is greatly reduced versus the use of traditional VPNs or, even worse, unprotected IP networks.

SUMMARY

According to at least one embodiment of the present invention, a method to establish an IP (Internet Protocol) connection, and consequent communication channel, between two endpoints located behind two distinct firewalls is provided wherein no inbound rules or inbound ports through either of the firewalls is required. The present invention provides heightened security by establishing a secure, sealed communication tunnel between the two endpoints using only outbound ports on both firewalls.

Further according to at least one embodiment of the present invention, the endpoints are located behind distinct firewalls, and IP packets are not forwarded inbound unless IP packets belong to an already existing stream of a previously established outbound connection. In other words, devices behind the firewalls are allowed by the firewall to establish outbound connections but are not allowed to receive inbound IP packets requesting the establishment of a new connection directed towards the endpoint device itself.

According to at least one embodiment of the present invention, the method provides for generating the secure tunnel on a one-time-use basis such that the tunnel is generated each time there is a need for communicating securely between the two endpoints, and the tunnel is terminated at the end of the communication session.

According to at least one embodiment of the present invention, the method provides for an end-to-end communication between two endpoints where the end-to-end communication secure tunnel is not part of a network of multiple endpoints.

According to at least one embodiment of the present invention, two distinct authentication methods are to be used: one to verify the identity of the user and/or the device requesting the establishment of the connection, and one to periodically verify the authenticity and correctness of encrypted data packets traveling over the virtual, or secure, tunnel which is the core component of the present invention. This ensures that only authorized users/devices can establish these tunnels, and that all encrypted data packets traveling inside of the secure tunnel are delivered from the sending endpoint to the receiving endpoint unchanged and untampered, while at the same time preventing reverse engineering, inference, computation or interception/decoding of the encryption key(s) by an unauthorized third party.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

U.S. Pat. No. 10,791,095, and U.S. patent application Ser. Nos. 16/866,171 and 16/915,121, and the contents thereof, all assigned to the same assignee as the present invention, are hereby incorporated in their entirety by reference.

BRIEF DESCRIPTION OF THE DRAWINGS

The novel features of the claimed invention are set forth with particularity in the appended claims. A better understanding of the features and advantages of the present invention will be obtained by reference to the following detailed description that sets forth illustrative embodiments, in which the principles of the invention are utilized, and the accompanying drawings or Figures (also "FIG." "Fig" or "FIGs." Herein) of which:

DETAILED DESCRIPTION

While some embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

For purposes of this Detailed Description, the following abbreviations shall have the associated meanings as listed below.

IETF—Internet Engineering Task Force is a group of individuals, experts in various fields of computer science and networking, who devise protocols and standards for the Internet to abide by.

IESG—Internet Engineering Steering Group is responsible for technical management of IETF activities and the Internet standards process.

RFC—Request For Comments is the main tool utilized by the IETF to work, as a group, on new proposed standards for the Internet and its protocols; when agreement is reached and sanctioned by the IESG, an RFC is frozen (cannot be altered anymore) and it becomes a standard that must be followed by any software and/or device that wishes to implement the protocol or method described in the RFC.

IP—short for Internet Protocol, for the purposes of this document IP may refer to any version of the Internet Protocol, not only the two most common ones (Ipv4 and Ipv6) but any version, whether or not is has been standardized by the IETF/IESG in an RFC.

AEAD—Authenticated Encryption with Associated Data are forms of encryption which simultaneously assure the confidentiality and authenticity of data.

VPN—Virtual Private Network, a set of multiple computing devices (endpoints) that can exchange IP traffic with each other using virtual IP addresses and, often, encrypted communication data packets.

RC—Request Collector, a software that is capable of collecting connection/communication requests and IP packets from various endpoints and mediate/relay them to other endpoints, acting as a pseudo-router, but—unlike a traditional router which works at ISO/OSI layer 3, the RC determines each packet's destination at ISO/OSI layer 7 (aka "application layer").

Figure 1:
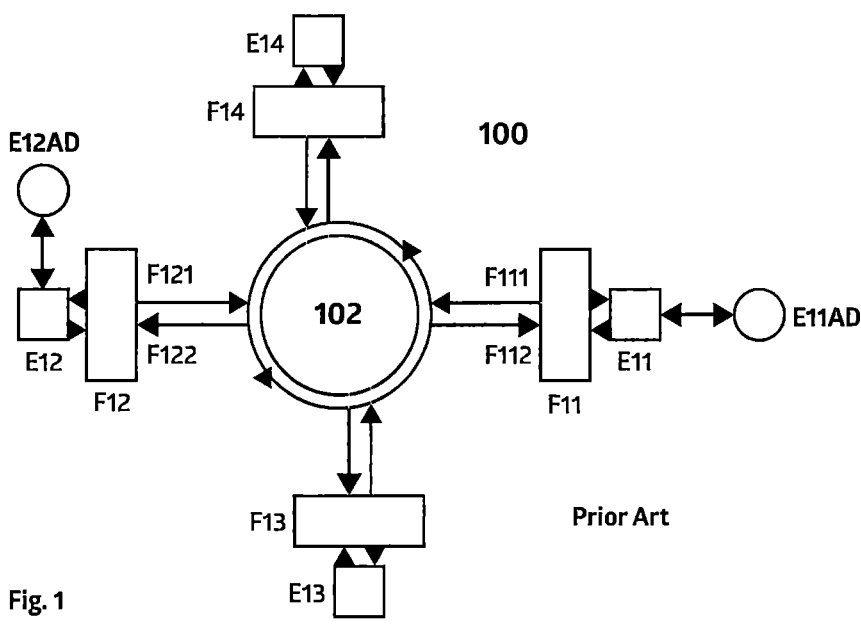
FIG. 1 illustrates an example of a system found in the present state of the art for virtual private networks (VPN).

FIG. 1 shows a representation of a VPN network 100 pursuant to the conventional art as commonly used in the industry. In FIG. 1, network 100 comprises endpoints, or devices, E11, E12 and E13 each behind their firewalls F11, F12 and F13 respectively. Network 100 further incorporates concentrator 102. A concentrator is an essential part of every VPN. VPN network 100 is utilized by the various endpoints to communicate and share resources.

Assume E11 desires to form an IP connection with E12. To connect securely within network 100, E11 and E12 must both be authenticated with VPN network 100. Of note, other endpoints, such as E13 and E14, may have also authenticated with VPN network 100 and are therefore within the secure environment of VPN network 100.

To establish the IP connection, E11, having a specific source IP address and firewall ports, sends, from an outbound firewall port F111 of E11, a connection establishment request packet (the first SYN packet) to E12. The connection request packet includes E11's IP address and inbound firewall port F112 to be utilized for the response, as well as the IP address and inbound firewall port F121 of E12. This request packet is received by concentrator 102 where concentrator 102 reads the IP address and inbound port of E12 and routes the request packet to E12's inbound port F121.

At this point, E11 must be authenticated with E12's active directory (AD) E12AD. Under the assumption that E11 can be authenticated with AD E12AD, E12 generates a response to E11 which is sent through outbound port F122 of firewall F12 to concentrator 102. The response will include E11's IP address and indicate inbound port F112 of firewall F11. Concentrator 102 will route the response to inbound ort F112 where E12 will be authenticated by E11's active directory E11AD. From there the two endpoints E11 and E12 will complete the handshake process and begin the communication session.

Note that all communication between E11 and E12 routes through concentrator 102. Concentrator 102 is always visible to each of the endpoints so long as the endpoints remain connected to VPN network 100. The endpoints remain connected to VPN network 100 until a user proactively shuts the VPN connection down or the endpoint device is powered off.

As mentioned previously, a significant weakness of VPN network 100 is all communication from other endpoints through concentrator 102 are routed to inbound ports. Inbound ports are susceptible to external hacking threats so long as the inbound port is open. That means that the firewall is open to malicious attacks the entire duration of connection to VPN network 100.

An additional weakness mentioned previously is malicious software entering VPN network 100 from any endpoint connected to network 100. Thus, if E14 has been infected with some malicious software such as malware, ransomware or other computer virus, since E14 is already connected to VPN network 100, the malicious software can permeate throughout the entire network 100 to all connected endpoints. Such malicious software could even keep E14 from ending the connection with VPN network 100, thus infecting not only those endpoints originally connected, but all endpoints connecting to network 100 thereafter.

Figure 2:
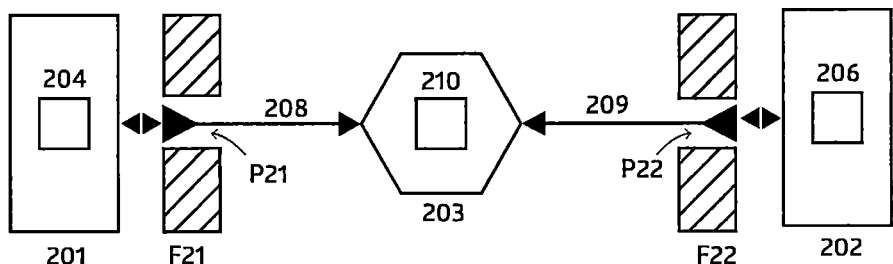
FIG. 2 shows an illustration of physical elements of an embodiment of the present invention.

FIG. 2 shows an illustration of physical elements of a first embodiment of the present invention. In this embodiment, a user device 201, or first endpoint, desires to securely connect with a remote machine 202, or second endpoint. Remote machine 202 can be any type of computing device such as a virtual machine or desktop computer but certainly not limited to these examples. The point is that remote machine 202 is remote, or in other words, outside the secure network where user device 201 is located, the secure network represented by firewall F21. In this embodiment, remote machine 202 is within a second secure network represented by firewall F22.

User device E201 is connected to a request collector RC203 through an outbound port P21 in firewall F21 along communication link 208. Similarly, remote machine E202 is connected to RC203 through an outbound port P22 in firewall F22 along communication link 209. Pursuant to the present invention, no inbound port is needed to be opened in either firewall F21 or firewall F22 as will be explained subsequently.

Certain functionalities of RC 203 are described in U.S. Pat. No. 10,791,095. This embodiment of the present invention shall expand upon the functionalities of RC203.

As various endpoints, such as user device E201 and remote machine E202, activate or come alive (if they are computing devices this is when they are turned on, if they are software this is when the software is run, etc.), pursuant to the current embodiment of the present invention, they connect outbound to RC203 or a cluster of multiple request collectors. In the explanation of the current embodiment of the present invention, only one request collector, RC203, will be used. Connecting outbound means the endpoints E201 and E202 connect to RC203 only through outbound ports in their respective firewalls. This connection must be always-on with automatic re-connection in case of connection loss. Therefore, E201 connects to RC203 through outbound port P21 along communication link 208, and E202 connects to RC203 through outbound port P22 along communication link 209.

Upon connecting to RC203, each endpoint E201 and E202 must additionally authenticate with RC203 in order to utilize mediation and packet-relay services which are provided by RC203 pursuant to the present invention. Without authentication, RC203 must refuse to provide these services to the endpoints. Agents 204 and 206 in endpoints E201 and E202, respectively, will authenticate with RC203's agent 210. In a preferred embodiment of the present invention, the authentication method of U.S. patent application Ser. No. 16/915,121 ('121) is utilized, but rather than the endpoint authenticating with the other endpoint, the requesting endpoint authenticates with agent 210 of RC203. Other authentication methods may be employed between endpoints E201, E202 and RC203, but the strength of the security supplied by the method outlined in '121 is preferred.

The connection, in the present invention, between, endpoints and RC203 utilize a "poll-pull" type of communication. A poll is a quick request asking if information which can be pulled is immediately available and implies a choice is to be made. A pull is extracting specific information where no choice is offered. The best suited and most widely adopted of such communication channels are websockets and gRPC (an open-source Remote Procedure Call), but any other "poll-pull" communication channels can also be used. For clarity, a "poll-pull" communication is a communication where the endpoint that initiated the connection can "poll" the open communication channel, and "pull" the data written onto it by the other (remote) endpoint if/when such data is available. It is ideal for the polling phase to be zero-cost (zero-cost is an operation that doesn't require the execution of any instruction on the CPU to accomplish the operation) or near-zero-cost, like a websocket or a gRPC stream, as explained above. These two examples of "poll-pull" are not the only two communication channels that fit the description, but are ideal in explaining the operation of the present invention.

Accordingly, link 208 is a poll-pull communication link between outbound port P21 and RC 203, and link 209 is a poll-pull communication link between P22 and RC 203

As mentioned previously, after an endpoint has authenticated with RC203, it can and will stay connected to RC203. If the connection is lost, the endpoint must reconnect and re-authenticate with RC203. This is essential, because RC203 can only mediate and relay packets between endpoints that are currently/actively connected to it. Endpoints that are not currently/actively connected to RC203 will be considered offline for the intents and purposes of the present invention.

Upon connecting with an endpoint, and after authenticating such endpoint, RC203 will assign a virtual address to such endpoint. This address is unique and different from the public IP address of the endpoint. RC203 must keep track, at all times, of all of the virtual addresses of all endpoints that are connected to RC203 which have successfully authenticated. This can be done by storing such information in an association table in RC203 (in memory or in long-term storage, including but not limited to a database) that, at a minimum, stores a unique ID for each endpoint along with its public IP address and its private address. It is preferred that the long-term storage/database of RC203 containing the public IP addresses, private addresses and virtual addresses be encrypted. Each request collector implementation may store additional information for each endpoint depending upon its configuration, all within the scope of the present invention.

RC203 comprises a table through which it can associate all virtual addresses of all known endpoints connected to and authenticated with RC203, and can therefore act as a pseudo-routing service between any pair of endpoints. For the purpose of the current invention, it is of paramount importance that, unlike a VPN, RC203 never, for any reason, allows the creation of virtual network circuits that involve more than 2 endpoints. Pursuant to the present invention, RC203 facilitates the establishment of and communication between only 2 endpoints such as E201 and E202.

Figure 3:
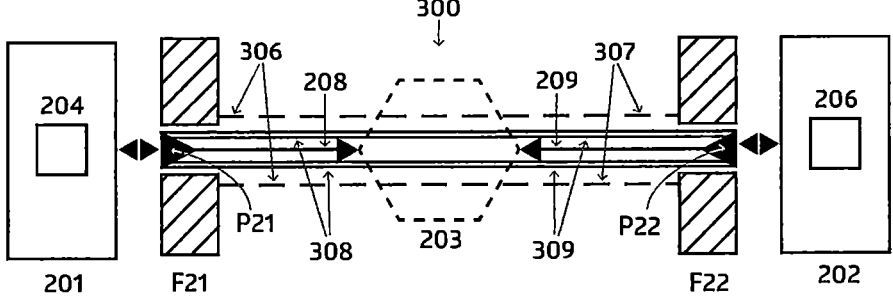
FIG. 3 illustrates elements of a secure tunnel pursuant to a preferred embodiment of the present invention.

Referring to FIG. 3, when an endpoint such as E201 wants to initiate a connection and establish a communication link with another endpoint such as E202 pursuant to the present invention, a secure tunnel is created. Secure tunnel 302 is shown connecting E201 and E202, and in particular, facilitating secure communication (indicated by links 308 and 309) between E201 and E202. Although RC 203 is shown performing an intermediary function, in fact, both E201 and E202 see links 308 and 309 as one continuous link directly between the two and never "see" RC203. The role of RC203 in relation to the secure tunnel 302 will be described subsequently.

Secure tunnel 302, pursuant to the present invention, does not utilize any inbound rules or inbound open ports. This is crucial to network security because inbound ports are subject to malicious attacks by hackers. Secure tunnel only utilizes outbound rules and outbound ports. Hackers are unable to penetrate through a firewall through an outbound port. This alone makes secure tunnel 302 significantly more secure than a VPN because VPN's utilize inbound ports for their operations. A firewall can keep a secure network secure when all inbound ports are closed. Therefore, the secure tunnel of the present invention only utilizes outbound ports in the firewall. Links 306, 307, 308 and 309 are encryption layers securing outbound communication channels 208 and 209 which are poll-pull communication links described with regards to FIG. 2.

Referring again to FIG. 3, secure tunnel 302 uses outbound port P21 in firewall F21 which secures the network of endpoint E201, and outbound port P22 in firewall F22 which secures the network of endpoint E202.

As mentioned previously, endpoints E201 and E202 each have an agent, 204 and 206 respectively. One of the functions of these agents is to negotiate an encryption key and initialization vector with the RC203 as described below. It should be understood that agents, as used throughout the entire description of the present invention, including agents 204, 206 and 210, and those described with respect to FIGS. 5 through 8, can be software loaded onto the endpoints and request collectors, or can be independent units that are combined as needed to the endpoints/request collectors such as flashdrives or USB units. However, these are only examples of potential agents and any other configuration is contemplated by the present invention.

The secure tunnel 302 comprises at least 2 layers of encryption. These include first layers 306 and 307 which are TLS websocket encryptions with mutual X.509 certificate verification, and second layers comprising 308 and 309 which are encryption with mutual PKI verification (SSH2-like). The TLS layer and PKI verification layer are connected to each endpoint only through the outbound ports P21 and P22 in the respective firewalls F21 and F22.

TLS stands for Transport Layer Security and can be used to transmit encrypted data over the Internet or other networks.

PKI is a set of roles, policies, hardware, software and procedures needed to create, manage, distribute, use, store and revoke digital certificates and manage public-key encryption. PKI as used throughout this description of the present invention relates to PKI-based encryption.

It must be noted that although secure tunnel 302 is shown in FIG. 3 as a continuous channel, in fact, secure tunnel 302 is 2 parts. As will be described in relation to FIG. 4, E201 negotiates secure keys with RC203 to establish first layer 306 and second layer 308 between outbound port P21 and RC 203. Similarly, E202 negotiates secure keys with RC 203 to establish first layers 307 and 309 between outbound port P22 and RC 203. Once secure channel 302 has been established pursuant to the steps outlined for FIG. 4, the communication between E201 and E202 appears to the two endpoints to proceed as if RC203 does not exist. This, in fact, is not the case since RC203 proceeds to play a role in the communication process as further outlined below.

The process of establishing the first and second layers of encryption for secure tunnel 300 using the secure keys, IV and AEAD negotiated with agent 210 as described above is well understood by those having ordinary skill in the art and will not be described as part of the present invention. This applies equally to the description for the embodiments of the present invention described in FIGS. 5 and 7.

Establishment of the Secure Tunnel

Figure 4:
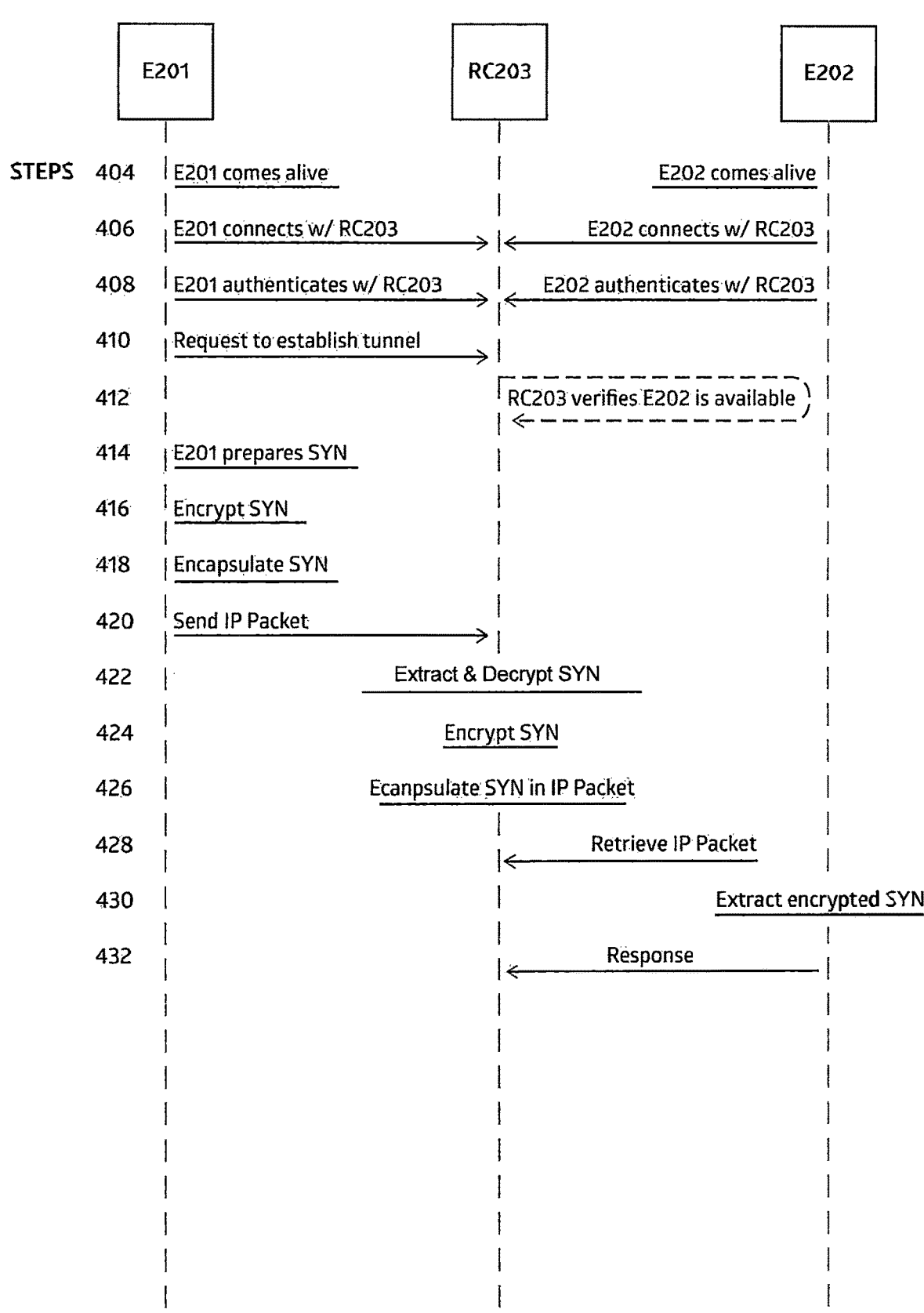
FIG. 4 shows the process to establish the secure tunnel pursuant to a preferred embodiment of the present invention.

FIG. 4 shows the process to establish the secure tunnel pursuant to a preferred embodiment of the present invention.

Assume, pursuant to the preferred embodiment of the present invention, that E201 is requesting access to E202 through a remote desktop protocol (RDP) request. Important to note that the present invention is not limited to RDP requests but include any point-to-point virtual tunneled IP communication including, but not limited to, TCP/IP, UDP/IP and others.

FIG. 4 illustrates the flow diagram for establishing secure tunnel 302 and communicating between E201 and E202 using secure tunnel 302.

As mentioned previously, as long as the endpoints are active, powered up or "alive", they are connected to RC203. Therefore, at step 404, E201 and E202 both come alive, and at step 406, they both connect to RC203.

At step 408, both E201 and E202 authenticate with RC203.

The authentication process for both E201 and E202 proceeds as follows. This process is the same for both E201 and E202. Pursuant to the authentication process, each endpoint, E201 and E202, negotiates with RC203 a shared encryption key and initialization vector. An initialization vector (IV) is an arbitrary number that can be used along with a secret key for data encryption. This number, also called a nonce, is employed only one time in any session. The use of an IV prevents repetition in data encryption, making it more difficult for a hacker using a dictionary attack to find patterns and break a cipher. Optionally, additional data, to be used for AEAD (Authenticated Encryption with Associated Data), may also be negotiated. The encryption key and IV (and potentially additional data for AEAD) are utilized only for a single session and will only be used to initialize one endpoint-to-endpoint connection.

The authentication process is preferably accomplished according to the methods described in U.S. Pat. No. 10,791, 095, U.S. patent application Ser. No. 16/866,171 and U.S. patent application Ser. No. 16/915,121, all of which are hereby incorporated in their entirety by reference. This authentication process is otherwise known as Xiid.IM. The Xiid.IM authentication is far more secure than other authentication systems currently available. Although Xiid.IM is preferred due to its high level of security in authentication, the present invention contemplates the use of any authentication method that provides for secure encryption keys, initialization vectors, and/or AEAD.

It is important to note that when the communication session between E201 and E202 is completed, the session is closed and the encryption key/IC is no longer valid. Every new connection will require a new encryption key, new IV, and other additional data for AEAD as needed.

With both E201 and E202 authenticated, at step 410, E201 sends a request to RC203 to establish secure tunnel 302, and at step 412 RC203 verifies that E202 is available. Availability of E202 also means that E202 has already authenticated with RC203 pursuant to the authentication process described above.

At the instigation of the communication between E201 and E202 and at step 414, E201 prepares a "SYN" (or synchronization) IP packet, similar to the process of initiating a standard IP 3-way handshake, and incorporates and utilizes the virtual address of E202 stored in RC203.

E201 next encrypts the SYN packet (step 416) using an encryption algorithm (AEAD recommended) incorporating the encryption key and initialization vector (and additional data if available) that was negotiated between endpoint E201 and RC203 in step 408.

At step 418, E201 encapsulates the fully encrypted SYN packet of step 416 into an outer IP packet which has RC203 as its destination. This outer IP packet is not a SYN packet because the connection between E201 and RC203 is already established and ongoing.

At step 420, E201 sends the entire IP packet (includes the inner SYN packet) to RC203. Upon receipt, RC203 extracts the inner SYN packet from the outer IP packet and decrypts the SYN packet (step 422).

Once RC203 has decrypted the SYN packet, RC203 reads from the decrypted SYN packet the virtual address of the destination endpoint for the SYN packet, which in the case of the current embodiment of the present invention is E202. RC203 then encrypts (step 424) the SYN packet with the session key, initialization vector, and additional data which were negotiated between E202 and RC 203 in step 408. The newly encrypted SYN packet is encapsulated into a new IP packet having E202's actual (non-virtual) IP address as its destination address (step 426). RC203 makes this new IP packet (with the newly encrypted SYN packet inside) available to E202 over a TLS connection that already exists between RC203 and E202. This TLS connection does not require any inbound firewall rule because E202 and RC203 already have an ongoing TLS connection (306) that was previously initiated as an outbound connection by E202 towards RC203. As explained in relation to FIG. 3, the TLS connections (306) from both endpoint firewalls originate only from outbound ports and never utilize inbound ports.

At step 428 the new IP packet having E202's address is retrieved over the existing TLS channel by E202.

At step 430, E202 receives (reads) the packet RC203 has made available to E202 over the existing TLS channel (306), and extracts the encrypted contents from it.

E202 uses the shared key, initialization vector, and optional additional data (when available) negotiated with RC203 in step 408 to decrypt the encrypted inner packet that it has extracted from the outer IP packet. This gives E202 access, in clear, to the packet payload prepared by E201 in step 414.

At this point, E202 responds (step 432) to the SYN packet from E201. The response follows the same steps listed in steps 414 through 430 only in reverse with the initial packet prepared by E202 and sent to E201 through RC203. One difference is the payload. The payload in the packet is not a SYN packet but contains a response in the case of step 432.

As long as secure tunnel 302 remains active between E201 and E202, communication follows the steps outlined in steps 414 through 430 with the noted exception that the payload is no longer a SYN packet but varies depending upon the communication occurring between E210 and E202.

It should be readily apparent to one having ordinary skill in the relevant art that the present invention is a far more secure method of communicating from one endpoint to a remote endpoint, such as through RDP, than the prior art including VPNs. The present invention allows point-to-point communication without a network and without ever opening inbound ports within either firewall of the two endpoints.

The descriptions of the operations of the various elements of the secure tunnel pursuant to the present invention discussed with reference to FIG. 2 and FIG. 3 apply similarly to the operations of the various elements described in FIGS. 5 through 8.

Second Embodiment

Figure 5:
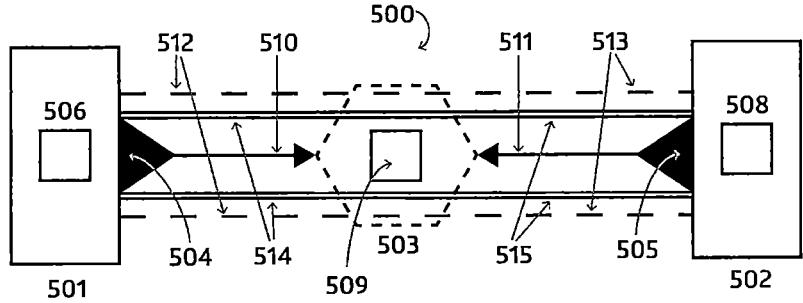
FIG. 5 illustrates elements of a secure tunnel pursuant to a second embodiment of the present invention.

FIG. 5 shows a second embodiment of the present invention. Specifically, FIG. 5 shows first endpoint E501 and second endpoint E502 where neither endpoints are located within a secure network. Unlike the embodiment described with regards to FIG. 2 and FIG. 3, firewalls F21 and F22 are not extant and therefore not shown, as well as ports P21 and P22.

Figure 6:
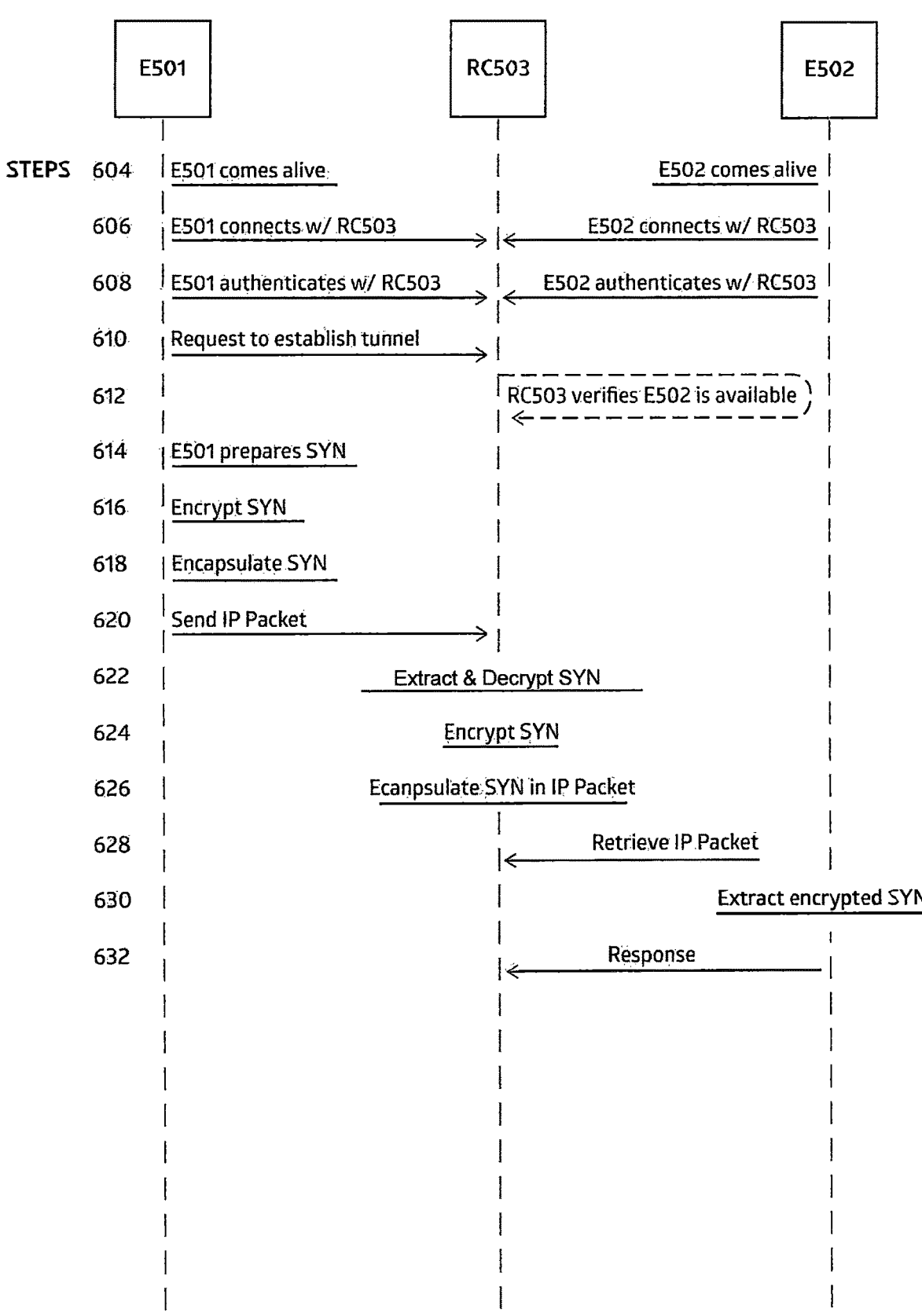
FIG. 6 shows the process to establish the secure tunnel pursuant to a second embodiment of the present invention.

The second embodiment shown in FIG. 5 and the flow diagram of FIG. 6, and represents the condition where two endpoints are to communicate in a secure manner outside the security of a firewall.

FIG. 5 shows the structure of the secure tunnel 500 that allows secure communication between endpoints E501 and E502. The secure tunnel 500 is similar to that of FIG. 3 and comprises at least 2 layers of encryption. These include first layer 512 which is a TLS websocket encryption with mutual X.509 certificate verification, and second layer 513 which is encryption with mutual PKI verification (SSH2-like). The TLS layer is connected to each endpoint only through the outbound rules 504 and 505 of 501 and 502, respectively.

It must be noted that although first layer 512 is shown in FIG. 5 as a continuous channel, in fact, first layer 512 is 2 parts. As will be described in relation to FIG. 6, E501, through agent 506, negotiates secure keys with RC503 to establish first and second layers 512 and 514 between outbound rule 504 and RC503. Similarly, E502, through agent 508, negotiates secure keys with RC503 to establish first and second layers 513 and 515 between outbound rule 505 and RC503. Communication occurs from E501 to RC 503 along communication link 510, and from E502 to RC 503 along communication link 511, wherein both 510 and 511 are both in the direction from endpoints E501 and E502 to RC 503. Once secure channel 500 has been established pursuant to the steps outlined for FIG. 6, the communication between E501 and E502 appears to the two endpoints to proceed as if RC503 does not exist. This, in fact, is not the case since RC503 proceeds to play a role in the communication process as further outlined with regards to FIG. 6.

In FIG. 5, first endpoint E501 activates, or becomes "alive" (step 604) and connects with request collector RC503 (step 606) using a first poll-pull communication link or communication link 510. This poll-pull communication link is to be understood from the description of the poll-pull communication of FIGS. 2 and 3. As described with respect to FIGS. 2 and 3, the best suited and most widely adopted of such communication channels are websockets and gRPC (an open-source Remote Procedure Call), but any other "poll-pull" communication channels can also be used.

At this point, E501 authenticates with RC503 (step 608). The authentication process proceeds in the same manner as described in the description of authentication for FIG. 2. Namely, agent 506 of E501 negotiates with agent 509 of RC503 a shared encryption key and IV. Further, additional data, to be used for AEAD (Authenticated Encryption with Associated Data), may also be negotiated.

As mentioned with regards to FIG. 4 above, the authentication process pursuant to the second embodiment of the present invention outlined in FIGS. 5 and 6 is preferably accomplished using Xiid.IM. Although Xiid.IM is preferred due to its high level of security in authentication, the present invention contemplates the use of any authentication method that provides for secure encryption keys, initialization vectors, and/or AEAD.

Second endpoint E502 becomes "alive" (step 604) and also connects with RC503 (step 606) using a second poll-pull communication link, or communication link 511, and authenticates with agent 509 of RC503 through agent 508 in the same manner that agent 506 of E501 authenticates with agent 509 of RC503.

As one having ordinary skill in the art will recognize, the poll-pull communication link will only utilize outbound rules. E501 and E502, pursuant to the second embodiment of the present invention, do not use inbound rules for the operation of the second embodiment of the present invention. The outbound rules are indicated in FIG. 5 for E501 and E502 as 503 and 504 respectively.

Agent 506 corresponds to agent 204 of the first embodiment described with respect to FIG. 2. Similarly, agent 508 corresponds to agent 206. Agents 506 and 508, similar to agents 204 and 206, negotiate with agent 509 of RC503 the shared encryption keys, IVs and additional data to be used for AEAD for E501 and E502 respectively.

Similar to that mentioned previously, as long as the endpoints E501 and E502 are active, powered up or "alive", they are connected to RC503. Further, similar to that described for FIGS. 2 and 3, when the communication session between E501 and E502 is completed, the session is closed and the encryption key/IC is no longer valid. Every new connection between E501 and E502 will require a new encryption key, new IV, and other additional data for AEAD as needed.

With both E501 and E502 authenticated with RC503, the secure communication process proceeds in a similar manner as that explained with regards to FIGS. 2 and 3 and as outlined in FIG. 4. Pursuant to the process, E501 has authenticated with RC503, E501 requests to establish a secure tunnel with RC503 (step 610) and RC503 confirms that E502 is available (step 612). E501 next prepares a first encrypted communication by encrypting the communication which E501 desires to send to E502. In the initial stage of the communication between the two endpoints, the communication is a SYN message (step 614). E501 encrypts the communication (step 616), and this first encrypted communication is encapsulated in a first IP packet (step 618). E501 sends the first IP packet to RC503 using the first poll-pull communication link (step 620).

RC503 receives the first IP packet, extracts the first encrypted communication and decrypts it (step 622) to obtain the communication which E501 is sending to E502, which in the initial stage is the SYN message.

At step 624, the request collector prepares a second encrypted communication by encrypting the communication and encapsulates the second encrypted communication in a second IP packet (step 626) and makes the IP packet available to the second poll-pull communication link;

At step 628 the second endpoint E502 extracts the second IP packet from the RC503 using the second poll-pull communication link.

E502 receives the IP packet from the second poll-pull communication link (step 628), extracts the second encrypted communication from the IP packet and decrypts the second encrypted communication to obtain the communication (step 630).

When E502 desires to respond back to E501, the process described in steps 614 through 630 proceeds as described above except in reverse. In other words, E502 prepares a communication, encrypts it, encapsulates it into an IP packet and sends it to RC503 through communication link 511. RC503 extracts the encrypted communication from the IP packet and decrypts it. Whereupon, RC503 encrypts the communication using the keys, IV and AEAD negotiated with E501 and encapsulates the newly encrypted message in an IP packet and makes it available to be retrieved by E501 through the communication link 510. Upon receipt of the IP packet from RC503, E501 extracts the encrypted communication from the IP packet and decrypts the communication.

Third Embodiment

Figure 7:
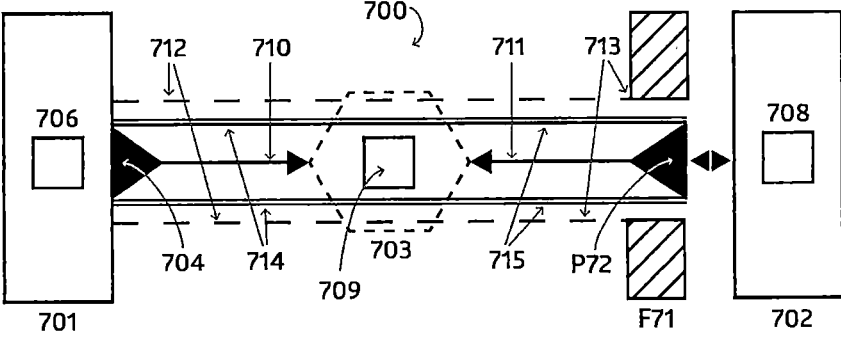
FIG. 7 illustrates elements of a secure tunnel pursuant to a third embodiment of the present invention.

FIG. 7 shows a third embodiment of the present invention.

As mentioned above, the descriptions of the operations of the various elements of the secure tunnel pursuant to the present invention discussed with reference to FIG. 2 and FIG. 3 apply similarly to the operations of the various elements described in FIGS. 5 through 8.

Figure 8:
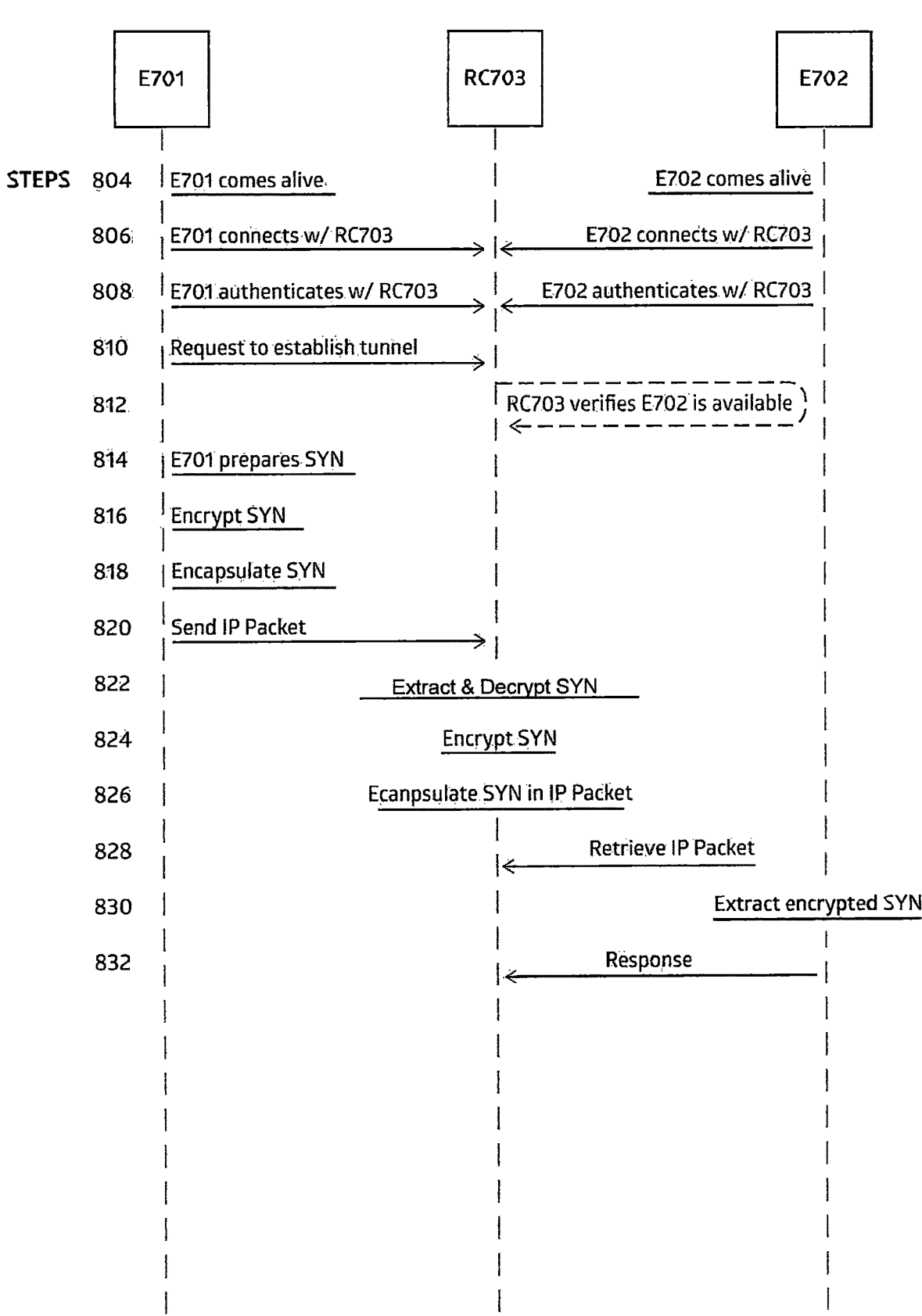
FIG. 8 shows the process to establish the secure tunnel pursuant to a third embodiment of the present invention.

The third embodiment of the present invention shows the situation where a remote endpoint, E702, in a secure network behind firewall F71. One having ordinary skill in the art will recognize that the third embodiment shown in FIG. 7 and the flow diagram of FIG. 8 is a hybrid of the first and second embodiments of FIGS. 3 and 5, namely an endpoint without a firewall desires to connect securely with an endpoint behind a firewall.

FIG. 7 shows the structure of the secure tunnel 700 that allows secure communication between endpoints E701 and E702. In this embodiment, E702 is behind firewall F71. Further, firewall F71 has outbound port P72 which connects to request collector RC703 along communication link 711.

E701 communicates with RC703 along communication link 710. The secure tunnel 700 is similar to that of FIGS. 3 and 5 and comprises at least 2 layers of encryption. These include first layer 712 which is a TLS websocket encryption with mutual X.509 certificate verification, and second layer 713 which is encryption with mutual PKI verification (SSH2-like). The TLS layer is connected to E501 through the outbound rules 704 whereas E502, as mentioned above, is connected to the TLS layer through outbound port P72 of firewall F71.

As with FIG. 5, although first layer 712 is shown in FIG. 7 as a continuous channel, in fact, first layer 712 is 2 parts. As will be described in relation to FIG. 8, E701, through agent 706 negotiates secure keys with RC703 to establish first and second layers 712 and 714 between outbound rule 704 and RC703. Similarly, E702, through agent 708, negotiates secure keys with RC703 to establish first and second layers 713 and 715 between outbound port P72 and RC703. Communication occurs from E701 to RC 703 along communication link 710, and from E702 to RC 703 along communication link 711, wherein both 710 and 711 are both in the direction from endpoints E701 and E702 to RC 703. Once secure channel 700 has been established pursuant to the steps outlined for FIG. 8, the communication between E701 and E702 appears to the two endpoints to proceed as if RC703 does not exist. This, in fact, is not the case since RC503 proceeds to play a role in the communication process as further outlined with regards to FIG. 8.

Referring now to FIG. 7 and FIG. 8, first endpoint E701 activates, or becomes "alive" (step 804) and connects with request collector RC703 (step 806) using a first poll-pull communication link, or communication link 710. This poll-pull communication link is to be understood from the description of the poll-pull communication of FIGS. 2 and 3. As described with respect to FIGS. 2 and 3, the best suited and most widely adopted of such communication channels are websockets and gRPC (an open-source Remote Procedure Call), but any other "poll-pull" communication channels can also be used.

At this point, E701 authenticates with RC703 (step 808). The authentication process proceeds in the same manner as described in the description of authentication for FIG. 2. Namely, agent 706 of E701 negotiates with agent 709 of RC703 a shared encryption key and IV. Further, additional data, to be used for AEAD (Authenticated Encryption with Associated Data), may also be negotiated.

The authentication process pursuant to the third embodiment of the present invention outlined in FIGS. 7 and 8 is preferably accomplished using Xiid.IM, but the present invention contemplates the use of any authentication method that provides for secure encryption keys, initialization vectors, and/or AEAD.

Second endpoint E702 becomes "alive" (step 804) and also connects with RC703 (step 806) using a second poll-pull communication link, or communication link 711, and authenticates with agent 709 of RC703 through agent 708 in the same manner that agent 706 of E701 authenticates with agent 709 of RC703.

As one having ordinary skill in the art will recognize, the poll-pull communication link will only utilize outbound rules. E701 and E702, pursuant to the third embodiment of the present invention, do not use inbound rules for the operation of the third embodiment of the present invention. The outbound rule for E701 is indicated in FIG. 7 for E701 as 503 and the outbound port for E702 is P72.

Agent 706 corresponds to agent 204 of the first embodiment described with respect to FIG. 2. Similarly, agent 708 corresponds to agent 206. Agents 706 and 708, similar to agents 204 and 206, negotiate with agent 709 of RC703 the shared encryption keys, IVs and additional data to be used for AEAD for E701 and E702 respectively.

Similar to that mentioned previously, as long as the endpoints E701 and E702 are active, powered up or "alive", they are connected to RC703. Further, similar to that described for FIGS. 2 and 3, when the communication session between E701 and E702 is completed, the session is closed and the encryption key/IC are no longer valid. Every new connection between E701 and E702 will require a new encryption key, new IV, and other additional data for AEAD as needed.

With both E701 and E702 authenticated with RC703, the secure communication process proceeds in a similar manner as that explained with regards to FIGS. 2 and 3 and as outlined in FIG. 4. Pursuant to the process, E701 has authenticated with RC703, E701 requests to establish a secure tunnel with RC703 (step 810) and RC703 confirms that E702 is available (step 812). E701 next prepares a first encrypted communication by encrypting the communication which E701 desires to send to E702. In the initial stage of the communication between the two endpoints, the communication is a SYN message (step 814). E701 encrypts the communication (step 816), and this first encrypted communication is encapsulated in a first IP packet (step 818). E701 sends the first IP packet to RC703 using the first poll-pull communication link (step 820).

RC703 receives the first IP packet, extracts the first encrypted communication and decrypts it (step 822) to obtain the communication which E701 is sending to E702, which in the initial stage is the SYN message.

At step 824, the request collector prepares a second encrypted communication by encrypting the communication and encapsulates the second encrypted communication in a second IP packet (step 826) and makes the IP packet available to the second poll-pull communication link;

At step 828 the second endpoint E702 extracts the second IP packet from the RC703 using the second poll-pull communication link through outbound port P72.

E702 receives the IP packet from the second poll-pull communication link (step 828), extracts the second encrypted communication from the IP packet and decrypts the second encrypted communication to obtain the communication (step 830).

When E702 desires to respond back to E701, the process described in steps 814 through 830 proceeds as described above except in reverse. In other words, E702 prepares a communication, encrypts it, encapsulates it into an IP packet and sends it to RC703 through communication link 711. RC703 extracts the encrypted communication from the IP packet and decrypts it. Whereupon, RC703 encrypts the communication using the keys, IV and AEAD negotiated with E701 and encapsulates the newly encrypted message in an IP packet and makes it available to be retrieved by E701 through the communication link 710. Upon receipt of the IP packet from RC703, E701 extracts the encrypted communication from the IP packet and decrypts the communication.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned Detailed Description, the descriptions and illustrations of the preferred embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents. It is intended that the following claims define the scope of the invention and that methods and structures within the scope of these claims and their equivalents be covered thereby.

What is claimed is:

1. A method for secure communication between two endpoints comprising:

a first endpoint connects with a request collector using a first poll-pull communication link originating from an outbound port of a firewall of the first endpoint, wherein the first endpoint authenticates with the request collector;

a second endpoint connects with the request collector using a second poll-pull communication link originating from an outbound port of a firewall of the second endpoint, wherein the second endpoint authenticates with the request collector;

the first endpoint prepares a first SYN (synchronization packet) and encrypts the first SYN to create a first encrypted SYN, encapsulates the first encrypted SYN in a first IP packet and sends the first IP packet to the request collector using the first poll-pull communication link;

the request collector receives the first IP packet and extracts and decrypts the first encrypted SYN to obtain the first SYN;

the request collector prepares a second encrypted SYN by encrypting the first SYN and encapsulates the second encrypted SYN in a second IP packet and makes the second IP packet available to the second poll-pull communication link;

the second endpoint retrieves the second IP packet from the request collector using the second poll-pull communication link through the outbound port of the firewall of the second endpoint; and the second endpoint extracts the second encrypted SYN from the second IP packet and decrypts the second encrypted SYN to obtain the first SYN.

2. The method for secure communication according to claim 1 wherein an agent of the first endpoint authenticates with an agent of the request collector.

3. The method for secure communication according to claim 2 wherein the agent of the first endpoint and the agent of the request collector negotiate first secure keys during authentication.

4. The method for secure communication according to claim 1 wherein an agent of the second endpoint authenticates with the agent of the request collector.

5. The method for secure communication according to claim 4 wherein the agent of the second endpoint and the agent of the request collector negotiate second secure keys during authentication.

6. The method for secure communication according to claim 3 wherein the first endpoint encrypts the first SYN with the first secure keys to obtain the first encrypted SYN.

7. The method for secure communication according to claim 6 wherein the request collector decrypts the first encrypted SYN with the first secure keys to obtain the SYN.

8. The method for secure communication according to claim 5 wherein the request collector encrypts the first SYN with the second secure keys to obtain the second encrypted SYN.

9. The method for secure communication according to claim 8 where the second endpoint decrypts the second encrypted SYN with the second secure keys to obtain the first SYN.

10. The method for secure communication according to claim 1 further comprising:

the second endpoint prepares a third encrypted SYN by encrypting a second SYN, encapsulates the third encrypted SYN in a third IP packet and sends the third IP packet to the request collector using the second poll-pull communication link;

the request collector receives the third IP packet and extracts and decrypts the third encrypted SYN to obtain the second SYN;

the request collector prepares a fourth encrypted SYN by encrypting the second SYN and encapsulates the fourth encrypted SYN in a fourth IP packet and makes the fourth IP packet available to the first poll-pull communication link;

the first endpoint retrieves the fourth IP packet from the request collector using the first poll-pull communication link through the outbound port of the outbound port of the first endpoint; and the first endpoint extracts the fourth encrypted SYN from the IP packet and decrypts the fourth encrypted SYN to obtain the second SYN.

11. A system for secure communications between two endpoints comprising:

a first endpoint connected to a request collector through an outbound port of a first firewall of the first endpoint using a first poll-pull communication link originating from the outbound port of the first endpoint, wherein the first endpoint authenticates with the request collector;

a second endpoint connected to the request collector through an outbound port of a second firewall of the second endpoint using a second poll-pull communication link originating from the outbound port of the second endpoint, wherein the second endpoint authenticates with the request collector;

the first endpoint transmitting to the request collector along the first poll-pull communication link a first encrypted SYN (synchronization packet) that has been encrypted by the first endpoint and embedded in a first IP packet;

the request collector retrieving the first encrypted SYN from the first IP packet and decrypting the first encrypted SYN to obtain a first SYN;

the request collector generating a second encrypted SYN from the first SYN and embedding the second encrypted SYN in a second IP packet and making the second IP packet available to the second poll-pull communication; and the second endpoint retrieving the second IP packet through the second outbound port using the second poll-pull communication link, extracting the second encrypted SYN from the second IP packet, and decrypting the second encrypted SYN to obtain the first SYN.

12. The system for secure communication according to claim 11 wherein an agent of the first endpoint authenticates with an agent of the request collector.

13. The system for secure communication according to claim 12 wherein the agent of the first endpoint and the agent of the request collector negotiate first secure keys during authentication.

14. The system for secure communication according to claim 11 wherein an agent of the second endpoint authenticates with the agent of the request collector.

15. The system for secure communication according to claim 14 wherein the agent of the second endpoint and the agent of the request collector negotiate second secure keys during authentication.

16. The system for secure communication according to claim 13 wherein the first endpoint encrypts the SYN with the first secure keys to obtain the first encrypted SYN.

17. The system for secure communication according to claim 16 wherein the request collector decrypts the first encrypted SYN with the first secure keys to obtain the SYN.

18. The system for secure communication according to claim 15 wherein the request collect encrypts the SYN with the second secure keys to obtain the second encrypted SYN.

19. The system for secure communication according to claim 18 where the second endpoint decrypts the second encrypted SYN with the second secure keys to obtain the SYN.

20. The system for secure communication according to claim 11 comprising:

the second endpoint transmitting to the request collector along the second poll-pull communication link a third encrypted SYN that has been encrypted by the second endpoint and embedded in a third IP packet;

the request collector retrieving the third encrypted SYN from the third IP packet and decrypting the third encrypted SYN to obtain a second SYN;

the request collector generating a fourth encrypted SYN from the second SYN and embedding the fourth encrypted SYN in a fourth IP packet and making the fourth IP packet available to the first poll-pull communication; and the first endpoint retrieving the fourth IP packet through the first outbound port using the first poll-pull communication link, extracting the fourth encrypted SYN from the fourth IP packet, and decrypting the fourth encrypted SYN to obtain the second SYN.

* * * * *